United States Patent
Vyas et al.

(10) Patent No.: US 11,954,677 B2
(45) Date of Patent: Apr. 9, 2024

(54) SYSTEM AND METHOD FOR AUTHORIZING AND PROVISIONING A TOKEN TO AN APPLIANCE

(71) Applicant: Visa International Service Association, San Francisco, CA (US)

(72) Inventors: Surendra Vyas, Bangalore (IN); Vaibhav Shukla, Karnataka (IN); Sindhu Shankar Rao, Bangalore (IN); Satya Prakash Tripathi, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 426 days.

(21) Appl. No.: 17/041,633

(22) PCT Filed: Mar. 27, 2018

(86) PCT No.: PCT/US2018/024441
§ 371 (c)(1),
(2) Date: Sep. 25, 2020

(87) PCT Pub. No.: WO2019/190468
PCT Pub. Date: Oct. 3, 2019

(65) Prior Publication Data
US 2021/0049598 A1   Feb. 18, 2021

(51) Int. Cl.
*G06Q 20/38* (2012.01)
*G06Q 20/02* (2012.01)
(Continued)

(52) U.S. Cl.
CPC ......... *G06Q 20/3821* (2013.01); *G06Q 20/02* (2013.01); *G06Q 20/40* (2013.01); *G06Q 30/06* (2013.01)

(58) Field of Classification Search
None
See application file for complete search history.

(56) References Cited

U.S. PATENT DOCUMENTS

| 7,742,995 B2 | 6/2010 | Phillips |
| 9,053,471 B2 | 6/2015 | Mages et al. |
| | (Continued) | |

FOREIGN PATENT DOCUMENTS

| CN | 101523428 A | 9/2009 |
| CN | 105580038 A | 5/2016 |
| | (Continued) | |

OTHER PUBLICATIONS

"RFID skimming", Wikipedia, 2016, retrieved from wikipedia.org/w/index.php?title=RFID_skimming&oldid=751821758.
(Continued)

*Primary Examiner* — Chrystina E Zelaskiewicz
(74) *Attorney, Agent, or Firm* — The Webb Law Firm

(57) ABSTRACT

Provided herein is a computer-implemented method for provisioning a token to an appliance. The method includes registering an original account identifier to an appliance, wherein the original account identifier is not associated with any user, associating a device token to the original account identifier, wherein the device token is stored by the appliance, associating a user account identifier for a user to at least one of the device token and the original account identifier, receiving, from the appliance, a transaction request for a transaction, the transaction request including the device token, identifying the user account identifier based on the device token, determining that the transaction is authorized based at least partially on the user account identifier and the original account identifier registered to the at least one appliance, and in response to determining that
(Continued)

the transaction is authorized, processing the transaction. A system and appliance are also disclosed.

20 Claims, 5 Drawing Sheets

(51) Int. Cl.
  *G06Q 20/40* (2012.01)
  *G06Q 30/06* (2023.01)

(56) References Cited

U.S. PATENT DOCUMENTS

| | | | |
|---|---|---|---|
| 9,401,905 B1 | 7/2016 | Kowalski et al. | |
| 9,990,786 B1 | 6/2018 | Ziraknejad | |
| 9,996,835 B2 | 6/2018 | Dill et al. | |
| 10,529,017 B1 | 1/2020 | Gianakopoulos | |
| 11,037,129 B1* | 6/2021 | Chen | G06Q 20/3224 |
| 2008/0209534 A1 | 8/2008 | Keronen et al. | |
| 2009/0164382 A1 | 6/2009 | Sally | |
| 2009/0187492 A1 | 7/2009 | Hammad et al. | |
| 2009/0023395 A1 | 9/2009 | Cohen et al. | |
| 2012/0242526 A1 | 9/2012 | Perez et al. | |
| 2013/0024372 A1 | 1/2013 | Spodak et al. | |
| 2014/0006277 A1 | 1/2014 | Rao | |
| 2014/0064735 A1 | 3/2014 | Thompson et al. | |
| 2014/0245411 A1 | 8/2014 | Meng et al. | |
| 2014/0344153 A1* | 11/2014 | Raj | G06Q 20/385 705/44 |
| 2015/0127547 A1* | 5/2015 | Powell | G06Q 20/382 705/67 |
| 2015/0227829 A1 | 8/2015 | Finn et al. | |
| 2015/0254650 A1* | 9/2015 | Bondesen | G06Q 20/3674 705/67 |
| 2015/0262180 A1 | 9/2015 | Hambleton et al. | |
| 2015/0319158 A1 | 11/2015 | Kumnick | |
| 2015/0334165 A1 | 11/2015 | Arling et al. | |
| 2015/0339663 A1 | 11/2015 | Lopreiato et al. | |
| 2015/0348166 A1 | 12/2015 | Trivedi et al. | |
| 2015/0350806 A1 | 12/2015 | Britton et al. | |
| 2016/0050565 A1 | 2/2016 | Benoit et al. | |
| 2016/0078434 A1 | 3/2016 | Huxham et al. | |
| 2016/0148202 A1 | 5/2016 | McCormack et al. | |
| 2016/0171479 A1 | 6/2016 | Prakash et al. | |
| 2016/0180370 A1 | 6/2016 | Bogomilsky | |
| 2016/0217459 A1 | 7/2016 | Lindner et al. | |
| 2016/0253657 A1* | 9/2016 | Sohn | G06Q 20/40 705/44 |
| 2016/0275488 A1 | 9/2016 | Liu et al. | |
| 2016/0277380 A1 | 9/2016 | Wagner et al. | |
| 2016/0292686 A1 | 10/2016 | Laxminarayanan et al. | |
| 2016/0314458 A1 | 10/2016 | Douglas et al. | |
| 2016/0321651 A1 | 11/2016 | Douglas | |
| 2016/0373458 A1* | 12/2016 | Moreton | H04L 63/126 |
| 2017/0017958 A1* | 1/2017 | Scott | G06Q 20/40 |
| 2017/0215073 A1 | 7/2017 | Raleigh | |
| 2017/0262841 A1* | 9/2017 | Good | G06Q 20/385 |
| 2018/0005231 A1 | 1/2018 | Grassadonia et al. | |
| 2018/0053157 A1 | 2/2018 | Roffey | |
| 2018/0167762 A1 | 6/2018 | Hatambeiki et al. | |
| 2018/0218454 A1 | 8/2018 | Simon et al. | |
| 2018/0232613 A1 | 8/2018 | Chang et al. | |
| 2018/0375665 A1 | 12/2018 | Contenti et al. | |
| 2019/0087814 A1 | 3/2019 | Lassouaoui et al. | |
| 2020/0065473 A1 | 2/2020 | Berdy et al. | |
| 2020/0374292 A1 | 11/2020 | Rakshit et al. | |

FOREIGN PATENT DOCUMENTS

| | | |
|---|---|---|
| JP | 2002197297 A | 7/2002 |
| JP | 2010538359 A | 12/2010 |
| JP | 2014032517 A | 2/2014 |
| JP | 2015164039 A | 9/2015 |
| JP | 6073942 B2 | 2/2017 |
| JP | 2017068651 A | 4/2017 |
| JP | 2017537421 A | 12/2017 |
| JP | 2018503202 A | 2/2018 |
| KR | 20010110084 A | 12/2001 |
| KR | 20020025988 A | 4/2002 |
| KR | 101484367 B1 | 1/2015 |
| KR | 20160008614 A | 1/2016 |
| KR | 1020160046179 A | 4/2016 |
| KR | 20160146784 A | 12/2016 |
| WO | 2013045743 A2 | 4/2013 |
| WO | 2016045743 A1 | 3/2016 |
| WO | 2017209767 A1 | 12/2017 |

OTHER PUBLICATIONS

Taichiro et al., "Sharp HMS Cloud Platforms", Sharp Technical Journal [online], 2016, pp. 9-12. (English-language Abstract).

* cited by examiner

SYSTEM AND METHOD FOR AUTHORIZING AND PROVISIONING A TOKEN TO AN APPLIANCE

CROSS-REFERENCE TO RELATED APPLICATION

This application is the United States national phase of International Application No. PCT/US2018/024441 filed Mar. 27, 2018, the disclosure of which is hereby incorporated by reference in its entirety.

BACKGROUND

1. Technical Field

Disclosed embodiments or aspects relate generally to a system and method for providing an appliance with an original personal account number, and, in some non-limiting embodiments or aspects, to a system and method for authorizing and provisioning a token to an appliance for conducting transactions.

2. Technical Considerations

Technological developments in the Internet of Things have enabled smart appliances to transact with merchants over a network. However, currently such smart appliances must make use of the owner's financial instrument, such as a credit card, for transacting with merchants. In other words, the owner makes the payment through digital credentials provisioned on the appliances, which are mapped to financial instruments issued to the owner.

Currently, smart appliances enabled to transact with merchants have a token, corresponding to a personal account number (PAN) issued to the device owner, provisioned on the device, which the device forwards to acquirers and, in turn, to a transaction service provider. At the transaction service provider, the token and a PAN are mapped in a token vault to authorize or decline the transaction.

However, the current model poses a number of major disadvantages. First, a user needs to provision a token associated with the user's own PAN to the appliance, thereby exposing the owner's financial information, potentially across multiple appliances and to numerous merchants or acquirers. Second, with the rise in the sharing economy model, a single person no longer uses one appliance continuously, or exclusively, for long periods, and the current model of providing an owner's PAN on the appliance is not suitable. Moreover, the current model is not feasible for appliances that do not have a single "owner," e.g., rental cars. Further, improvements in technology and business models have given rise to appliances that are intelligent and have decision-making ability. However, an appliance owner may not wish to allow the appliance to make purchases autonomously, which has the potential to disseminate the owner's financial information widely.

Accordingly, there is a need in the art for a method and system for enabling commerce from appliances without relying on financial instruments issued to the appliance owner. Such a solution is possible when appliances are issued on their own financial instruments, e.g., credit/debit cards, which can be tokenized and associated with an owner's financial information, and then used to conduct transactions.

SUMMARY

According to some non-limiting embodiments or aspects, provided is a computer-implemented method for provisioning a token to an appliance, including the steps of registering, with at least one processor, an original account identifier to at least one appliance, wherein the original account identifier is not associated with any user; associating, with at least one processor, a device token to the original account identifier, wherein the device token is stored by the at least one appliance; associating, with at least one processor, a user account identifier for a user to at least one of the device token and the original account identifier registered to the at least one appliance; receiving, from the at least one appliance, a transaction request for a transaction, the transaction request comprising the device token; identifying, with at least one processor, the user account identifier based on the device token; determining, with at least one processor, that the transaction is authorized based at least partially on the user account identifier and the original account identifier registered to the at least one appliance; and in response to determining that the transaction is authorized, processing the transaction.

According to some non-limiting embodiments or aspects, provided herein is a system for provisioning a token to an appliance, including at least one processor programmed and/or configured to register an original account identifier to at least one appliance, wherein the original account identifier is not associated with any user associated with a device token to the original account identifier, wherein the device token is stored by the at least one appliance; associate a user account identifier for a user to at least one of the device token and the original account identifier registered to the at least one appliance; receive, from the at least one appliance, a transaction request for a transaction, the transaction request comprising the device token; identify the user account identifier based on the device token; determine that the transaction is authorized based at least partially on the user account identifier and the original account identifier registered to the at least one appliance; and in response to determining that the transaction is authorized, process the transaction.

According to some non-limiting embodiments or aspects, provided herein is a computer-implemented method for interacting with at least one appliance to process a transaction, including the steps of registering, with at least one processor, an original account identifier to at least one appliance, wherein the original account identifier is not associated with any user; receiving, from the at least one appliance, a transaction request comprising at least one of the original account identifier and a token uniquely identifying the original account identifier; generating, with at least one processor, an authorization request comprising the original account identifier; and communicating the authorization request to an issuer system associated with the original account identifier.

According to some non-limiting embodiments or aspects, provided herein is an appliance for conducting transactions without a user-specific account, including a memory internal to the appliance, the memory including a device account identifier not associated with any user and a device token uniquely associated with the device account identifier; a communication device; and a processor in communication with the memory and the communication device, the processor programmed or configured to generate a transaction request comprising at least one of the device account identifier and the device token.

Further non-limiting embodiments or aspects are set forth in the following numbered clauses:

Clause 1: A computer-implemented method for authorizing and provisioning a token to an appliance, comprising:

registering, with at least one processor, an original account identifier to at least one appliance, wherein the original account identifier is not associated with any user; associating, with at least one processor, a device token to the original account identifier, wherein the device token is stored by the at least one appliance; associating, with at least one processor, a user account identifier for a user to at least one of the device token and the original account identifier registered to the at least one appliance; receiving, from the at least one appliance, a transaction request for a transaction, the transaction request comprising the device token; identifying, with at least one processor, the user account identifier based on the device token; determining, with at least one processor, that the transaction is authorized based at least partially on the user account identifier and the original account identifier registered to the at least one appliance; and in response to determining that the transaction is authorized, processing the transaction.

Clause 2: The computer-implemented method of clause 1, wherein determining that the transaction is authorized comprises: communicating an authorization request to an issuer system associated with the original account identifier registered to the at least one appliance; communicating an authorization request to an issuer system associated with the user account identifier; and receiving at least one authorization response message from at least one of the issuer system associated with the user account identifier and the issuer system associated with the original account identifier registered to the at least one appliance.

Clause 3: The computer-implemented method of clause 1 or clause 2, wherein registering the original account identifier to the at least one appliance comprises associating at least one device identifier unique to the at least one appliance with the original account identifier.

Clause 4: The computer-implemented method of any of clauses 1-3, further comprising: aggregating transaction values from the transaction and at least one other transaction initiated by the at least one appliance within a time period to calculate an aggregated transaction value; and generating an authorization request to deduct the aggregated transaction value from a user account corresponding to the user account identifier.

Clause 5: The computer-implemented method of any of clauses 1-4, further comprising generating a device profile for the at least one appliance based at least partially on at least one of the following appliance parameters: model, manufacturer, transaction history, age, service history, or any combination thereof.

Clause 6: The computer-implemented method of any of clauses 1-5, further comprising generating a credit/debit limit value for the at least one appliance based at least partially on the device profile.

Clause 7: The computer-implemented method of any of clauses 1-6, wherein processing the transaction comprises: determining that a transaction value associated with the transaction satisfies the credit limit value; in response to determining that the transaction value does not satisfy the credit limit value, communicating a rejection of the transaction to the at least one appliance or to an acquirer system; receiving, from the at least one appliance and/or at least one other appliance, a new transaction request for the transaction, the new transaction request comprising the device token and at least one other device token associated with the at least one other appliance; and in response to determining that the new transaction is authorized, processing the new transaction by charging a first portion of the transaction value to an account corresponding to the device token and a second portion of the transaction value to an account corresponding to the at least one other device token.

Clause 8: The computer-implemented method of any of clauses 1-7, wherein registering the original account identifier to the at least one appliance comprises generating the credit limit value.

Clause 9: The computer-implemented method of any of clauses 1-8, further comprising altering, with at least one processor and based at least partially on the device profile, the credit limit value.

Clause 10: The computer-implemented method of any of clauses 1-9, further comprising associating a merchant domain restriction with the device token based at least partially on the at least one device profile.

Clause 11: The computer-implemented method of any of clauses 1-10, wherein processing the transaction comprises: determining, based on the device token and the merchant domain restriction, that a transaction is authorized; and in response to determining that the transaction is authorized, processing the transaction.

Clause 12: A system for authorizing and provisioning a token to an appliance, comprising at least one processor programmed and/or configured to: register an original account identifier to at least one appliance, wherein the original account identifier is not associated with any user; associate a device token to the original account identifier, wherein the device token is stored by the at least one appliance; associate a user account identifier for a user to at least one of the device token and the original account identifier registered to the at least one appliance; receive, from the at least one appliance, a transaction request for a transaction, the transaction request comprising the device token; identify the user account identifier based on the device token; determine that the transaction is authorized based at least partially on the user account identifier and the original account identifier registered to the at least one appliance; and in response to determining that the transaction is authorized, process the transaction.

Clause 13: The system of clause 12, wherein the at least one processor is programmed and/or configured to determine that the transaction is authorized by: communicating an authorization request to an issuer system associated with the original account identifier registered to the at least one appliance; communicating an authorization request to an issuer system associated with the user account identifier; and receiving at least one authorization response message from at least one of the issuer system associated with the user account identifier and the issuer system associated with the original account identifier registered to the at least one appliance.

Clause 14: The system of clause 12 or clause 13, wherein the at least one processor is programmed and/or configured to register the original account identifier to the at least one appliance by associating at least one device identifier unique to the at least one appliance with the original account identifier.

Clause 15: The system of any of clauses 12-14, wherein the at least one processor is further programmed and/or configured to: aggregate transaction values from the transaction and at least one other transaction initiated by the at least one appliance within a time period to calculate an aggregated transaction value; and generate an authorization request to deduct the aggregated transaction value from a user account corresponding to the user account identifier.

Clause 16: The system of any of clauses 12-15, wherein the at least one processor is further programmed and/or configured to generate a device profile for the at least one appliance based at least partially on at least one of the following appliance parameters: model, manufacturer, transaction history, age, service history, or any combination thereof.

Clause 17: The system of any of clauses 12-16, wherein the at least one processor is further programmed and/or configured to generate a credit limit value for the at least one appliance based at least partially on the device profile.

Clause 18: The system of any of clauses 12-17, wherein the at least one processor is programmed and/or configured to process the transaction by: determining that a transaction value associated with the transaction satisfies the credit limit value; in response to determining that the transaction value does not satisfy the credit limit value, communicating a rejection of the transaction to the at least one appliance; receiving, from the at least one appliance and/or at least one other appliance, a new transaction request for the transaction, the new transaction request comprising the device token and at least one other device token associated with the at least one other appliance; and in response to determining that the new transaction is authorized, processing the new transaction by charging a first portion of the transaction value to an account corresponding to the device token and a second portion of the transaction value to an account corresponding to the at least one other device token.

Clause 19: The system of any of clauses 12-18, wherein registering the original account identifier to the at least one appliance comprises generating a credit limit value.

Clause 20: The system of any of clauses 12-19, wherein the at least one processor is further programmed and/or configured to alter, based at least partially on the device profile, the credit limit value.

Clause 21: The system of any of clauses 12-20, wherein the at least one processor is programmed and/or configured to alter the credit limit value when the user account identifier is associated to the device token or the original account identifier is registered to the at least one appliance.

Clause 22: The system of any of clauses 12-21, wherein the at least one processor is programmed or configured to associate a merchant domain restriction with the device token based at least partially on the device profile.

Clause 23: The system of any of clauses 12-22, wherein the at least one processor is programmed and/or configured to process the transaction by: determining, based on the device token and the associated merchant domain restriction, whether a transaction is authorized; and in response to determining that the transaction is not authorized, communicating a rejection of the transaction to the at least one appliance; or in response to determining that the transaction is authorized, processing the transaction.

Clause 24: A computer-implemented method for authorizing an appliance to process a transaction, comprising: registering, with at least one processor, an original account identifier to at least one appliance, wherein the original account identifier is not associated with any user; receiving, from the at least one appliance, a transaction request comprising at least one of the original account identifier and a token uniquely identifying the original account identifier; generating, with at least one processor, an authorization request comprising the original account identifier; and communicating the authorization request to an issuer system associated with the original account identifier.

Clause 25: The computer-implemented method of clause 24, further comprising generating a device profile for the at least one appliance based at least partially on at least one of the following appliance parameters: model, manufacturer, transaction history, age, service history, or any combination thereof.

Clause 26: The computer-implemented method of clause 24 or clause 25, further comprising generating a credit limit value for the at least one appliance based at least partially on the device profile.

Clause 27: The computer-implemented method of any of clauses 24-26, further comprising: determining that a transaction value associated with the transaction request satisfies the credit limit value; in response to determining that the transaction value does not satisfy the credit limit value, communicate a rejection of the transaction to the at least one appliance; receiving, from the at least one appliance and/or at least one other appliance, a new transaction request for the transaction, the new transaction request comprising the device token and at least one other device token associated with the at least one other appliance; and in response to determining that the new transaction is authorized, processing the new transaction by charging a first portion of the transaction value to an account corresponding to the device token and a second portion of the transaction value to an account corresponding to the at least one other device token.

Clause 28: The computer-implemented method of any of clauses 24-27, wherein the credit limit value is generated during the step of registering the original account identifier to the least one appliance.

Clause 29: The computer-implemented method of any of clauses 24-28, further comprising altering, with at least one processor and based at least partially on the at least one device profile, the credit limit value.

Clause 30: The computer-implemented method of any of clauses 24-29, wherein the credit limit value is altered during the step of associating the user account identifier to the device token or the original account identifier registered to the at least one appliance.

Clause 31: The computer-implemented method of any of clauses 24-30, further comprising associating a merchant domain restriction with the device token based at least partially on the device profile.

Clause 32: The computer-implemented method of any of clauses 24-31, further comprising: determining, based on the device token and the associated merchant domain restriction, whether a transaction is authorized; and in response to determining that the transaction is not authorized, communicating a rejection of the transaction to the at least one appliance; or in response to determining that the transaction is authorized, generating, with at least one processor, an authorization request comprising the original account identifier; and communicating the authorization request to an issuer system associated with the original account identifier.

Clause 33: An appliance for conducting transactions without a user-specific account, comprising: a memory internal to the appliance, the memory comprising a device account identifier not associated with any user and a device token uniquely associated with the device account identifier; a communication device; and a processor in communication with the memory and the communication device, the processor programmed or configured to generate a transaction request comprising at least one of the device account identifier and the device token.

Clause 34: The appliance of clause 33, wherein the processor is further programmed or configured to: communicate the transaction request to a transaction processing system; receive a rejection of the transaction request from the transaction processing system; in response to receiving the rejection of the transaction request, generate a new transaction request for the transaction, the new transaction request comprising: at least one of the device account identifier and the device token; and at least one other device account identifier and/or device token associated with at least one other appliance; and communicate the new transaction request to the transaction processing system.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" includes plural referents unless the context clearly dictates otherwise.

BRIEF DESCRIPTION OF THE DRAWINGS

Additional advantages and details of the disclosure are explained in greater detail below with reference to the exemplary embodiments and aspects that are illustrated in the accompanying schematic figures, in which.

DETAILED DESCRIPTION

Figure 1:
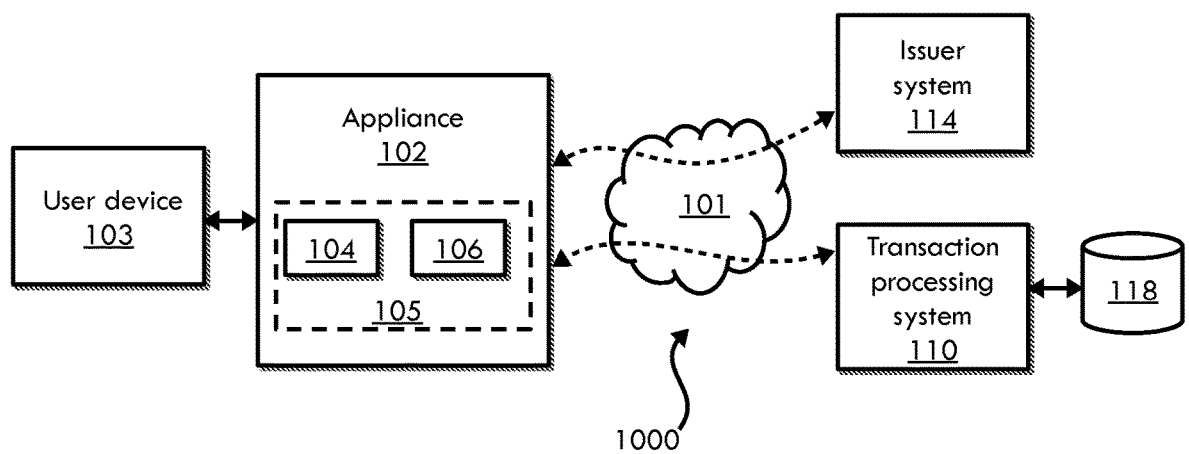
FIG. 1 is a schematic diagram of some non-limiting embodiments or aspects of a method and system for authorizing and provisioning a token to an appliance.

For purposes of the description hereinafter, the terms "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and the method illustrated in the attached drawings, and described in the following specification, are simply exemplary embodiments of the disclosure. Hence, specific dimensions and other physical characteristics related to the embodiments disclosed herein are not to be considered as limiting. Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, the term "appliance" refers to a consumer device including a processor, memory, and communication device configured to communicate with one or more networks. For example, and without limitation, an appliance may include a network-connected automobile, refrigerator, television, washer/dryer machine, coffee maker, thermostat, and/or the like.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "issuer institution" may refer to one or more entities, such as a bank, that provides accounts to customers for conducting payment transactions, such as initiating credit and/or debit payments. For example, an issuer institution may provide an account identifier, such as a personal account number (PAN), to a customer or appliance that uniquely identifies one or more accounts associated with that customer or appliance. The account identifier may be embodied on a physical financial instrument, such as a payment card, and/or may be electronic and used for electronic payments. As used herein, the term "account identifier" may include one or more PANs, tokens, or other identifiers associated with a customer account. An account identifier may be directly or indirectly associated with an issuer institution, such that an account identifier may be a token that maps to a PAN or other type of account identifier. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifiers in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "merchant" refers to any individual or entity that provides goods and/or services, or access to goods and/or services, to customers based on a transaction, such as a payment transaction. Merchants may include, but are not limited to, restaurants, food trucks, clubs, gymnasiums, retail stores, professional services providers (e.g., dentists, doctors, plumbers, etc.), parks, museums, attractions, sporting venues, and/or the like. It will be appreciated that numerous other types of merchants are within the scope of this disclosure.

As used herein, the term "acquirer institution" may refer to an entity licensed by the transaction service provider and approved by the transaction service provider to originate transactions using a portable financial device of the transaction service provider. The transactions may include original credit transactions (OCTs) and account funding transactions (AFTs). The acquirer institution may be authorized by the transaction service provider to originate transactions using a portable financial device of the transaction service provider. The acquirer institution may contract with a payment gateway to enable the facilitators to sponsor merchants. An acquirer institution may be a financial institution, such as a bank. The terms "acquirer institution," "acquirer bank," and "acquirer system" may also refer to one or more computer systems operated by or on behalf of an acquirer institution, such as a server computer executing one or more software applications.

As used herein, the term "financial device" may refer to a payment device, an electronic payment device, a portable (e.g., physical) payment card, a gift card, a smartcard, a smart media, a payroll card, a healthcare card, a wrist band, a machine-readable medium containing account information, a keychain device, a supermarket discount card, a cellular phone, a mobile device, a personal digital assistant (PDA), a pager, a security card, a computer, an access card, a wireless terminal, or a transponder. The financial device may include volatile or non-volatile memory to store information, such as the account number or a name of the account holder. The term "financial device" may also refer to any unique identifier, physical or digital, associated with a financial transaction account that can be used to complete a transaction between a user of the financial device and another party, such as a merchant. For example, a financial device may be a financial transaction account number and confirmation code that may be entered into an online store payment interface. It will be appreciated that many other configurations and embodiments are possible.

As used herein, the term "merchant system" may refer to one or more server computers, point-of-sale devices, online interfaces, third-party hosted services, and/or the like that are used to complete transactions with one or more financial devices. The term merchant system may also refer to one or more server computers, processors, online interfaces, third-party hosted services, and/or the like that are used to transmit and/or receive communications with issuer institutions, transaction service providers, transaction processing servers, financial device holders, and/or the like.

As used herein, the term "transaction service provider" may refer to an entity that collects authorization requests from merchants and provides guarantees of payment, in some cases through an agreement between the transaction service provider and an issuer institution. As used herein, the term "recurring transactions" may refer to any series of repeated or patterned transactions between a financial device and a merchant. Recurring transactions are often regular and of a similar amount but do not need to be identical in cost or identical in purchased goods/services to be recurring.

As used herein, the term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "mobile device" may refer to one or more portable electronic devices that are configured to communicate with one or more networks. As an example, a mobile device may include a cellular phone (e.g., a smartphone or standard cellular phone), a portable computer, a wearable device (e.g., watches, glasses, lenses, clothing, and/or the like), a PDA, and/or other like devices.

Non-limiting embodiments or aspects of the disclosure provide for an improved system and method for conducting transactions with appliances by issuing an original account identifier to an appliance, provisioning a token to the appliance, and authorizing the appliance for processing a transaction request. By issuing an original account identifier to an appliance and provisioning a token corresponding to the account identifier to the appliance, non-limiting embodiments or aspects allow for such appliances to be provided to users, such as purchasers or lessees, without risking exposure of the users' personal financial information that may be otherwise inputted into or associated with the appliance. Moreover, non-limiting embodiments or aspects provide for an improved appliance with memory including a device token and/or a device PAN that can be used to initiate and conduct transactions with various merchant systems. Such improved appliances provide for a more secure and efficient transaction flow, as well as other advantages described herein.

Provided herein are a system and method for provisioning a token to an appliance. FIG. 1 illustrates a system to provision a token to an appliance according to some non-limiting embodiments or aspects. In FIG. 1, the system (1000) includes an appliance (102), an issuer system (114), and a transaction processing system (110). The components may communicate through a network (101). During the manufacture of the appliance, or thereafter, an original device personal account number ($D_{PAN}$) (104) is registered to the appliance (102) by issuer system (114) and/or transaction processing system (110). The $D_{PAN}$ (104) is an original PAN that is not associated with a user or appliance owner at the time of issuance, such that the $D_{PAN}$ (104) is not issued to a human being, even though in some non-limiting embodiments or aspects, the $D_{PAN}$ (104) may be subsequently linked to a user PAN. In some non-limiting embodiments or aspects, both the issuer system (114) and the transaction processing system (110) collaborate to issue the $D_{PAN}$ (104) to the appliance. In some non-limiting embodiments or aspects, registering the original account identifier includes associating a unique device identifier specific to the appliance with the $D_{PAN}$ (104). The unique device identifier specific to the appliance may be encoded into memory (105) of the appliance (102).

With further reference to FIG. 1, in some non-limiting embodiments or aspects, the appliance (102) may be provisioned with the $D_{PAN}$ (104) for making transactions. However, in some non-limiting embodiments or aspects, the appliance may be provisioned with a device token ($D_{Token}$) (106) instead of or in addition to the $D_{PAN}$ (104). For example, a $D_{Token}$ (106) may be provisioned on the appliance (102) so as to not expose the $D_{PAN}$ (104) to any potential security vulnerabilities. It will be appreciated that, although FIG. 1 illustrates both the $D_{Token}$ (106) and $D_{PAN}$ (104), some non-limiting embodiments or aspects may include just the $D_{Token}$ (106) or just the $D_{PAN}$ (104).

Still referring to FIG. 1, in some non-limiting embodiments or aspects in which the appliance (102) is provisioned with the $D_{Token}$ (106), the transaction processing system (110) tokenizes the $D_{PAN}$ (104) by generating the $D_{Token}$ (106) and associating the $D_{Token}$ (106) with the $D_{PAN}$ (104). The associated $D_{PAN}$ (104) and $D_{Token}$ (106) are stored in a token vault (118) which, in some non-limiting embodiments or aspects, includes a secure database. At this stage, the $D_{PAN}$ (104) and $D_{Token}$ (106) are not associated with any user or owner financial information, such as a user PAN (e.g., a Master PAN ($M_{PAN}$)). Some non-limiting embodiments or aspects of a token vault architecture are illustrated below:

| Device Token ($D_{Token}$) | Device PAN ($D_{PAN}$) | Master PAN ($M_{PAN}$) |
|---|---|---|
| $D_{Token1}$ | $D_{PAN1}$ | NULL |

The transaction processing system (110) communicates $D_{Token}$ (106) to the appliance (102) for storage thereon. At this stage, the $D_{Token}$ (106) resides on the appliance (102) in an inactive state.

Appliance (102) may then be purchased, rented, or leased by a user. With further reference to FIG. 1, also illustrated is a user device (103). A user device (103) may be any type of client device that allows a user to interact with the appliance (102) and/or transaction processing system (110), for example, and without limitation, a smartphone, tablet, a computing device, a remote control, or the like. However, any action described as taking place through or using user device (103) should be understood to also be possible by direct interaction of the user with the appliance (102) itself, for example, through a user interface and input device disposed on appliance (102). The user device (103) may be used to activate $D_{Token}$ (106) stored in appliance (102).

In some non-limiting embodiments or aspects, once the $D_{PAN}$ (104) and/or $D_{Token}$ (106) are provisioned on the appliance (102), the appliance (102) may be used to initiate transaction requests using the $D_{PAN}$ (104) and/or $D_{Token}$ (106). However, in some non-limiting embodiments or aspects, the $D_{PAN}$ (104) and/or $D_{Token}$ (106) may need to be activated before being used. As an example, the $D_{PAN}$ (104) and/or $D_{Token}$ (106) may be activated by a user associating his or her $M_{PAN}$ with the $D_{PAN}$ (104) and/or $D_{Token}$ (106), such that the user is ultimately responsible for the transactions initiated using the $D_{PAN}$ (104) and/or $D_{Token}$ (106) while activated for that particular user.

In some non-limiting embodiments or aspects, $D_{Token}$ (106) is activated upon initial use of appliance (102) or upon a user selection to undergo an activation process. The user may be prompted to, through appliance (102) or user device (103), communicate ownership or possession of appliance (102) to transaction processing system (110). Transaction processing system (110), in response to an activation request initiated by the owner, then associates an account identifier associated with a portable financial device issued to the user (e.g., a credit or debit card), such as $M_{PAN}$, with the appliance (102). In some non-limiting embodiments or aspects, an activation request to associate the $M_{PAN}$ with $D_{PAN}$ (104) and/or $D_{Token}$ (106) is communicated through appliance (102) to transaction processing system (110). In some non-limiting embodiments or aspects, the user or appliance (102) provides identifying information for the appliance (102) to allow user to, through user device (103), communicate the association request to the transaction processing system (110). Identifying information may be any type of information that identifies the appliance (102), such as a unique device identifier. A unique device identifier may include, for example and without limitation, a serial number, a randomly generated alphanumeric identifier, a unique appliance attribute, and/or the like. In some non-limiting embodiments or aspects, the identifying information may be provided as machine-readable indicia, such as a barcode (e.g., a two-dimensional barcode, a three-dimensional barcode, a QR code, or the like), an RFID transponder, or the like that user device (103) can read and transmit to transaction processing system (110).

The user may also provide the $M_{PAN}$ through the user device (103), appliance (102), point-of-sale (POS) system, or through another device. As an example, a user may scan his or her portable financial device through a mobile application on the user device (103), which analyzes an image of the portable financial device and determines the $M_{PAN}$ and other information from the image, such as expiration date and security code. In other examples, the user may manually input the $M_{PAN}$ and other information. It will be appreciated that the user may provide the $M_{PAN}$ in any number of ways and, in some non-limiting examples, the transaction processing system (110) and/or issuer system (114) may already have the $M_{PAN}$ and can identify it based on an identification of the user. In some non-limiting embodiments or aspects, the user may present his or her portable financial device at a POS system at the time of purchasing or leasing the appliance (102) such that the $M_{PAN}$ is communicated to the transaction processing system (110) from the POS system. In still further examples, the user may provide the $M_{PAN}$ by logging into an existing bank account or electronic wallet. It will be appreciated that the $M_{PAN}$ may be provided in various other ways.

In response to transaction processing system (110) receiving an activation request initiated by the user, through appliance (102) or user device (103) as examples, the transaction processing system (110) may retrieve, identify, or receive the $M_{PAN}$ as explained above. Transaction processing system (110), in response to the activation request and/or obtaining the $M_{PAN}$, then associates the $M_{PAN}$ with the $D_{PAN}$ (104) and/or $D_{Token}$ (106) in the token vault (118):

| Device Token ($D_{Token}$) | Device PAN ($D_{PAN}$) | Master PAN ($M_{PAN}$) |
|---|---|---|
| $D_{Token1}$ | $D_{PAN1}$ | $M_{PAN1}$ |

In some non-limiting embodiments or aspects, a device profile may be generated for appliance (102). The device profile may be based on, for example and without limitation, one or more appliance parameters such as a unique identifier (e.g., a device identifier), an appliance type, an appliance model, an appliance manufacturer, an appliance transaction history, an appliance age, an appliance use time, an appliance service history, and/or combinations thereof. The device profile may be associated with the $D_{Token}$ (104) and/or $D_{PAN}$ (106) in a database, such as but not limited to the token vault (118). The device profile may be generated by the issuer system (114), the transaction processing system (110), the appliance itself (102), or any other device or system. In some non-limiting examples, the device profile may be a set of appliance parameters, a score or rating generated from a set of appliance parameters, or a predefined profile category.

In some non-limiting embodiments or aspects, domain restrictions may be generated for the appliance (102). In some non-limiting embodiments or aspects, the domain restrictions may be based at least partially on the device profile. Non-limiting examples of domain restrictions include credit/debit limit values, transaction limit values, restrictions on the number of transactions, duration (lifespan) of the $D_{Token}$, and/or merchant domain restrictions, such as merchant category restrictions or merchant location restrictions, and merchant loyalty or reward point program restrictions. As an example, in some non-limiting embodiments or aspects, an appliance provisioned with a $D_{Token}$ and/or $D_{PAN}$ may be restricted to making purchases for items and/or content usable by the appliance (e.g., streaming media for televisions, fuel for automobiles, and/or the like).

In some non-limiting embodiments or aspects, the domain restriction may be modified at varying times of the appliance's lifespan. For example, and without limitation, an appliance may be restricted to a certain credit/debit limit value prior to the $D_{Token}$ (106) and/or $D_{PAN}$ (104) being associated with an $M_{PAN}$. In some non-limiting embodiments or aspects, the credit/debit limit value may be increased with increasing duration of ownership and/or association with an $M_{PAN}$. In other non-limiting embodiments or aspects, an appliance user may manually request modification of the credit/debit limit value for an appliance.

In some non-limiting embodiments or aspects, the device profile may be used to implement targeted promotional recommendations, offers, and/or merchant loyalty or reward point program restrictions. Because an appliance's $D_{PAN}$ may be restricted for use with certain merchants and/or for the purchase of certain products/services or classes of products/services, a merchant may provide targeted promotions and offers to the appliance. As a result, loyalty rewards or points may accumulate more quickly given the specific field of use of the $D_{PAN}$. In some non-limiting examples, an appliance with a high balance of loyalty rewards or points may maintain a higher resale or residual value for a user/owner, should the user offer the appliance for sale, end a lease, or otherwise provide the appliance to someone else.

With continuing reference to FIG. 1, when a user of appliance (102) (e.g., owner of the appliance, user/lessee of the appliance, etc.) sells, returns, or otherwise relinquishes ownership, possession, and/or control of appliance (102), the user and/or user device (103) may communicate with transaction processing system (110) in a similar manner as described above for associating an $M_{PAN}$ to the $D_{PAN}$ (104) and/or $D_{Token}$ (106) (e.g., through user device (103) or directly through appliance (102)) to disassociate the owner's $M_{PAN}$ from the $D_{PAN}$ (104) and/or $D_{Token}$ (106). Transaction processing system (110) then disassociates the $M_{PAN}$ from the $D_{PAN}$ (104) and $D_{Token}$ (106) in token vault (118) as shown in the following table:

| Device Token ($D_{Token}$) | Device PAN ($D_{PAN}$) | Master PAN ($M_{PAN}$) |
|---|---|---|
| $D_{Token1}$ | $D_{PAN1}$ | NULL |

With no corresponding $M_{PAN}$ associated with the $D_{PAN}$ (104) and/or $D_{Token}$ (106) in token vault (118), no transaction may be validated or authorized. In addition, in some non-limiting embodiments or aspects, a credit/debit limit value can be decreased when a $D_{PAN}$ is disassociated from an $M_{PAN}$, reducing the potential loss due to any errors in validating/authorizing transactions. In some non-limiting embodiments or aspects, the $M_{PAN}$ may be disassociated from the $D_{PAN}$ and/or $D_{Token}$ in response to an activation request from another user or the same user with a different $M_{PAN}$.

Figure 2:
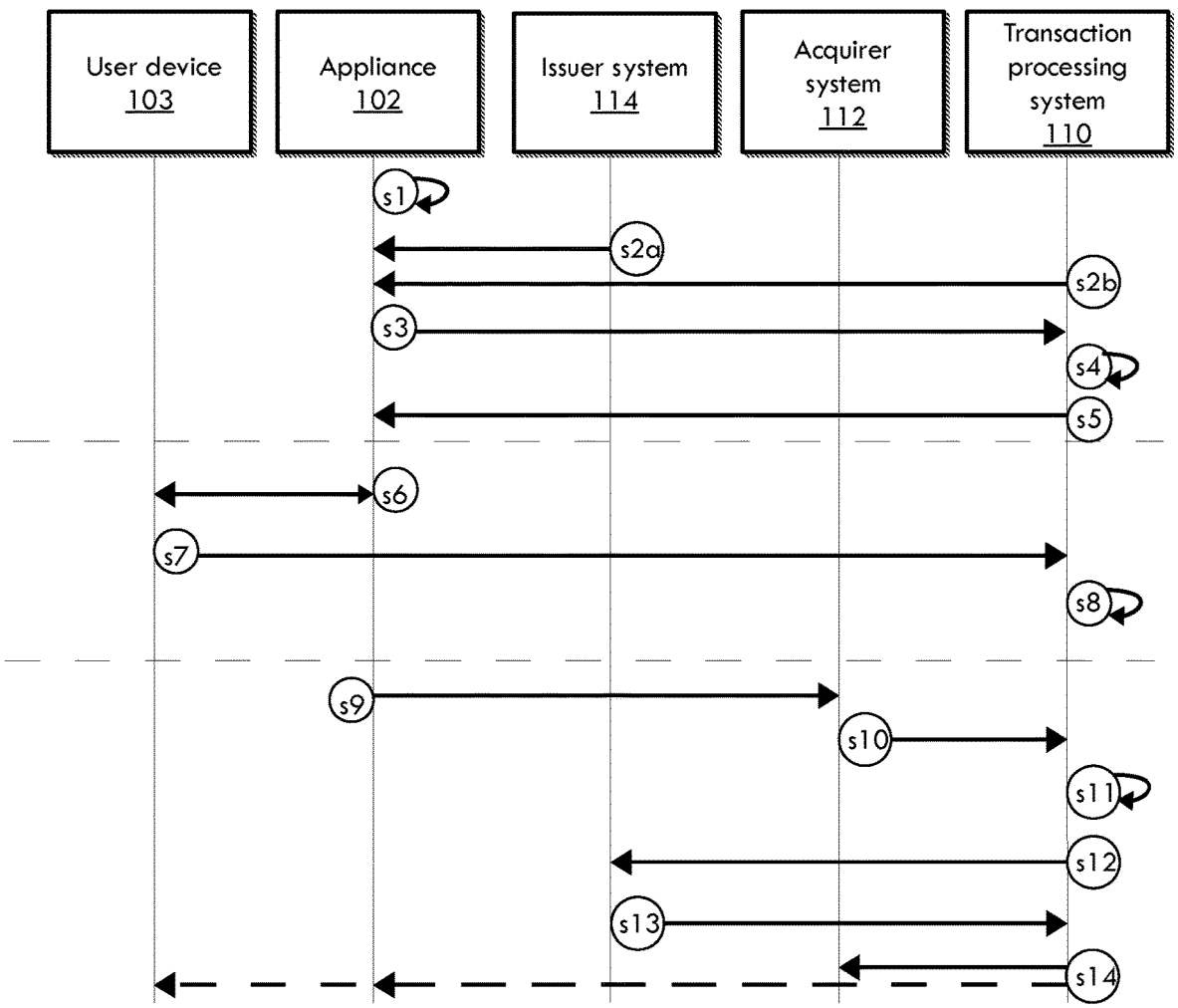
FIG. 2 is a process diagram of some non-limiting embodiments or aspects of a method for authorizing and provisioning a token to an appliance.

With reference to FIG. 2, illustrated is a method of provisioning a token to an appliance according to some non-limiting embodiments or aspects. In step (s1), the appliance manufacturer, distributor, or reseller includes in the appliance (102) memory for storing a $D_{PAN}$ and $D_{Token}$. In some non-limiting embodiments or aspects, the memory includes a secure and/or encrypted memory space. In some non-limiting embodiments or aspects, a $D_{Token}$ that is unassociated with a $D_{PAN}$ may be stored in memory at this time. In step (s2), a $D_{PAN}$ is issued to the appliance. The $D_{PAN}$ is issued by issuer system (114) in step (s2a), by transaction processing system (110) in step (s2b), or both. In some non-limiting embodiments or aspects, for example and without limitation, those in which transaction processing system (110) is not involved in issuing a $D_{PAN}$ and a $D_{Token}$ has not already been stored in the appliance, in step (s3), $D_{PAN}$ is communicated to transaction processing system to be tokenized. Transaction processing system tokenizes $D_{PAN}$ step (s4), thereby generating $D_{Token}$. The $D_{Token}$ is then communicated to the appliance (102) in step (s5), where it is stored, inactive until purchased, rented, leased, or other form of possession by a user.

After $D_{Token}$ is provisioned to the appliance (102), and with further reference to FIG. 2, $D_{Token}$ may be activated by a user. In step (s6) via user device (103) or the appliance (102) provides identifying information that owner communicates in step (s7) to transaction processing system (110) to allow transaction processing system (110) to associate the user's portable financial device, including the $M_{PAN}$, with the $D_{PAN}$ and/or $D_{Token}$ in step (s8).

Figure 3:
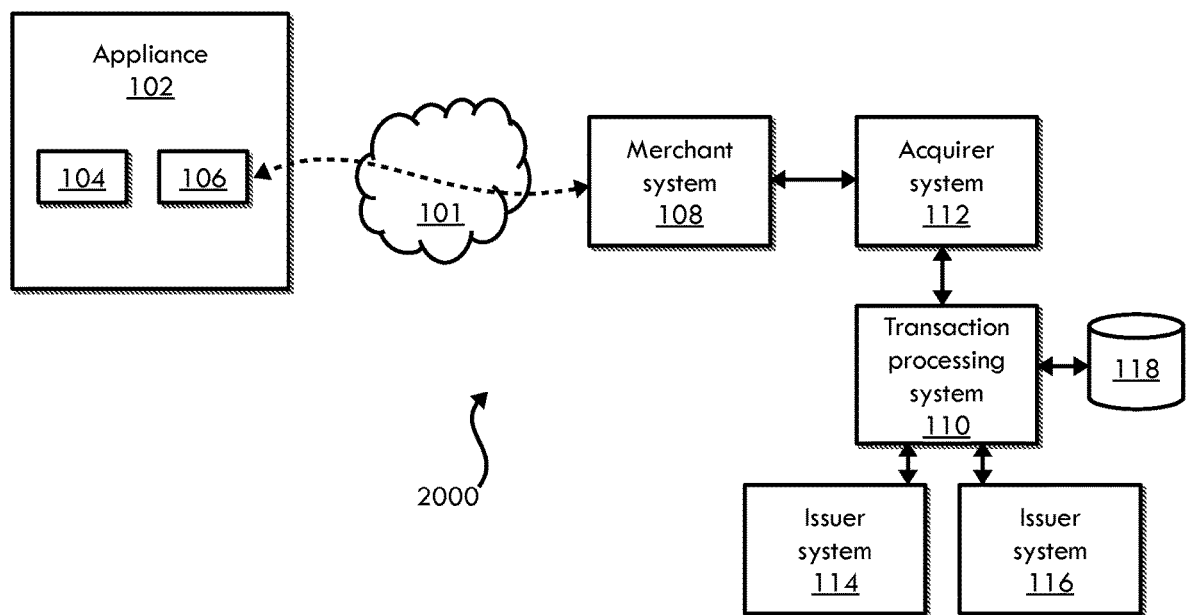
FIG. 3 is a schematic diagram of some non-limiting embodiments or aspects of a method and system for authorizing and provisioning a token to an appliance to process a transaction.

FIG. 3 illustrates a system (2000) to process a transaction using a $D_{Token}$ according to some non-limiting embodiments or aspects. In FIG. 3, the system (2000) includes an appliance (102), a merchant system (108), an acquirer system (112), an issuer system (114), and a transaction processing system (110). The components may communicate through network (101). When making a transaction, the appliance (102) communicates a transaction request, which may include $D_{Token}$ (106) and/or $D_{PAN}$ (104), and optionally, transaction data, to the merchant system (108), which then communicates the transaction request to the acquirer system (112), such as an acquiring bank's system. The transaction data may include, for example and without limitation, transaction value, transaction date, transaction time, transaction location, merchant identifier(s), identification of product(s)/service(s) being purchased, appliance information (e.g., a unique device identifier, a device profile, etc.) and/or the like. The acquirer system (112) then communicates the transaction request to the transaction processing system (110) to validate the transaction request and receive authorization to process the transaction. Such authorization may proceed in a two-step process.

First, in some non-limiting embodiments or aspects, the transaction processing system (110) may conduct a check of the $D_{Token}$ (106) and/or $D_{PAN}$ (104) in the token vault (118), and, in response to determining that the $D_{Token}$ (106) and/or $D_{PAN}$ (104) are associated with an $M_{PAN}$ in the token vault (118), the transaction processing system (110) may determine that the transaction is authorized. Determining that the transaction is authorized may also include checking any domain restrictions associated with the $D_{Token}$ (106) and/or $D_{PAN}$ (104), verifying that the $M_{PAN}$ is valid and can be used for the transaction and/or the like. In some non-limiting embodiments or aspects, determining that the transaction is authorized includes checking if a unique device identifier included in the transaction request matches a unique identifier associated with the $D_{Token}$ (106) and/or $D_{PAN}$ (104). If the transaction is determined to be authorized, transaction processing system (110) processes the transaction.

In some non-limiting embodiments or aspects, a second step of authorization may include the transaction processing system (110) determining that the transaction is authorized by communicating the $D_{PAN}$ (104) and, optionally in some non-limiting embodiments or aspects, transaction data, to issuer system (114) for authorization of the transaction. If issuer system (114) authorizes the transaction, an authorization response message is generated and communicated to the transaction processing system (110), which then processes the transaction.

In some non-limiting embodiments or aspects, the transaction processing system (110) determines that the transaction is authorized based at least partially on the device profile of the appliance (102). For example, in some non-limiting embodiments or aspects, the transaction processing system (110) may determine that the transaction is authorized based at least partially on a domain restriction specified in a device profile of the appliance (102). If the transaction processing system (110) determines that a transaction request satisfies the domain restriction, the transaction may be authorized and processed. Likewise, in response to determining that a transaction request does not satisfy the domain restriction, the transaction processing system (110) may communicate a rejection to the acquirer system (112), merchant system (108), appliance (102), and/or user device (103) (not shown).

In some non-limiting embodiments or aspects, multiple appliances and/or multiple device tokens may be used to engage in a transaction. For example, if a transaction request communicated from the appliance (102) is determined to not satisfy a domain restriction (e.g., the transaction value exceeds a credit limit or transaction limit), credit limits (or other domain restrictions) for multiple appliances associated with the user may be aggregated to allow for the transaction to take place. In such non-limiting embodiments or aspects, transaction processing system (110) charges a first portion of the transaction value to $D_{Token}$ (106) by sending an authorization request including $D_{PAN}$ (104) to issuer system (114) for authorization, and charges a second portion of the transaction value to one or more $D_{Tokens}$ associated with one or more additional appliances. In some non-limiting embodiments or aspects, the appliances themselves may determine whether a domain restriction is satisfied. For example, the appliances may be in communication with one another such that an additional appliance (e.g., an appliance other than the originally requesting appliance (102)) may communicate its domain restrictions to the appliance (102) in response to the appliance (102) determining that it is unable to request the transaction based on its domain restrictions or receiving a rejection. In some non-limiting embodiments or aspects, the domain restrictions may be determined to be applicable or not applicable by the transaction processing system (110), issuer system (114), or some other system.

In some non-limiting embodiments or aspects, the transaction processing system (110) determines that the transaction is authorized by communicating $M_{PAN}$ and, optionally in some non-limiting embodiments or aspects, the transaction data to an issuer system (116) associated with the $M_{PAN}$. If issuer system (116) authorizes the transaction, an authorization response is communicated to the transaction processing system (110), which then processes the transaction.

In some non-limiting embodiments or aspects, when transaction processing system (110) processes a transaction initiated by appliance (102), the transaction processing system (110) generates an authorization request to deduct an amount corresponding to the transaction value and communicates the authorization request to issuer system (116). In some non-limiting embodiments or aspects, transaction processing system (110) aggregates transaction data for transactions initiated by appliance (102) over a certain time period, and generates and communicates to issuer system (116) a single authorization request to deduct an amount corresponding to the aggregated transaction amount.

Returning to FIG. 2, also illustrated is a method of processing a transaction initiated by appliance (102) according to some non-limiting embodiments or aspects. In step (s9), appliance (102) communicates a transaction request to a merchant system (108) (not shown) or acquirer system (112). The transaction request includes transaction data, the $D_{Token}$, and in some non-limiting examples, the $D_{PAN}$. In step (s10), the acquirer system (112) communicates the transaction data, the $D_{Token}$ and, in some non-limiting examples the $D_{PAN}$, to the transaction processing system (110) for validation and authorization. In step (s11), transaction processing system (110) checks token vault to verify that the $D_{Token}$ and/or $D_{PAN}$ is/are associated with an $M_{PAN}$. If the $D_{Token}$ and/or $D_{PAN}$ are associated with an $M_{PAN}$, in step (s12) an authorization request, including the $D_{PAN}$ and, in some non-limiting embodiments or aspects, transaction data, is sent to issuer system (114). If the transaction is authorized, issuer system (114) communicates an authorization response to transaction processing system (110) in step (s13). If authorized, transaction processing system (110) processes the transaction and, in step (s14), communicates an authorization response to merchant acquirer system (112) and, in some non-limiting examples, to appliance (102) and/or appliance user, for example, through a notification communicated to user device (103).

Figure 4:
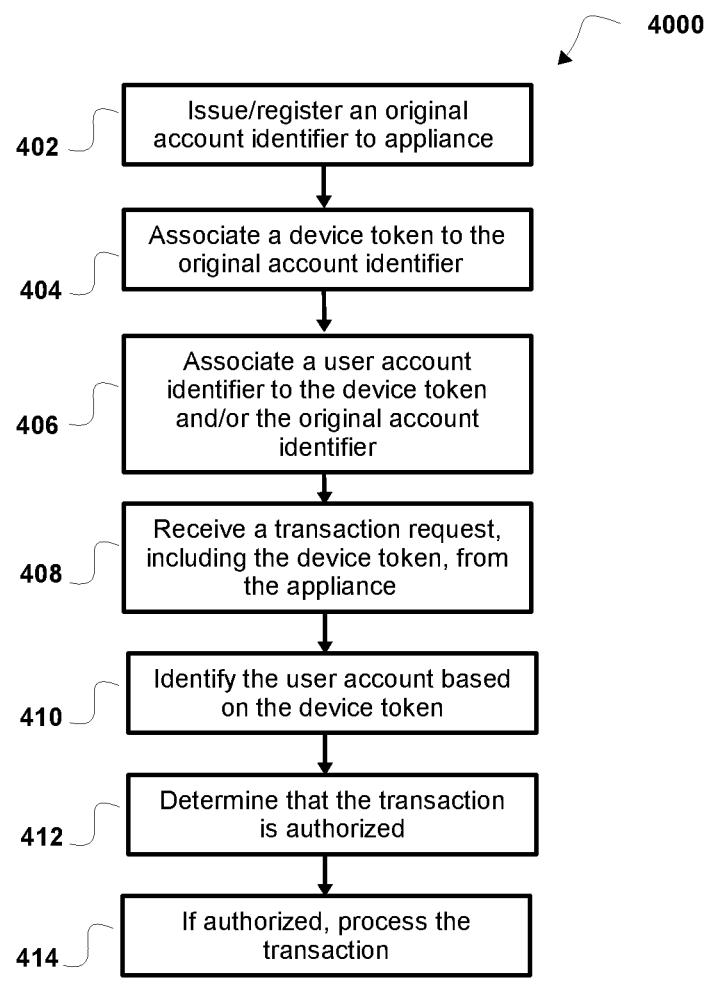
FIG. 4 is a process diagram of some non-limiting embodiments or aspects of a method for authorizing and provisioning a token to an appliance to process a transaction.

Referring now to FIG. 4, shown is a flow diagram of some non-limiting embodiments or aspects of a method (4000) for authorizing and provisioning a token to an appliance. One or more steps of the method (4000) may be performed partially or completely by a transaction processing system, such as described herein, although it will be appreciated that other devices and/or systems may perform one or more steps in some non-limiting embodiments or aspects. As shown in FIG. 4, at step (402), an original account identifier is issued to an appliance. As described herein, the original account identifier ($D_{PAN}$) is not associated with any user or appliance owner at the time of issuance. In step (404), a device token ($D_{Token}$) is associated to the original account identifier ($D_{PAN}$). The $D_{Token}$ may be generated or may already exist. The $D_{Token}$ may be stored in memory on the appliance. In step (406), a user account identifier ($M_{PAN}$) is associated with the $D_{Token}$ and/or the $D_{PAN}$. As described above, this association can be stored in a token vault. The $M_{PAN}$ may be a distinct original account identifier for a user that exists independently of the $D_{PAN}$.

With continued reference to FIG. 4, in step (408), a transaction request, including the $D_{Token}$, is received from the appliance. In step (410), a user account, such as $M_{PAN}$ or a corresponding token, is identified based at least partially on the $D_{Token}$. Thereafter, in step (412), a determination is made as to whether the transaction is authorized. This determination is based at least partially on the $D_{PAN}$ and, in some non-limiting embodiments or aspects, at least partially on the $D_{PAN}$ and the $M_{PAN}$. In step (414), in response to determining that the transaction is authorized, the transaction is processed. For example, in response to determining that the transaction is initially authorized because the $D_{PAN}$ is associated with an $M_{PAN}$, the transaction processing system may generate and communicate an authorization request to an issuer system to obtain final authorization that the transaction can be completed.

Figure 5:
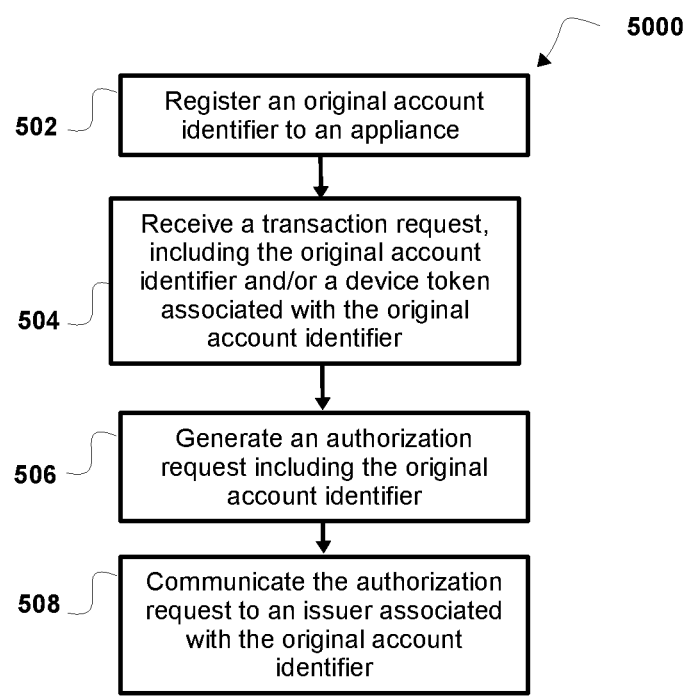
FIG. 5 is a process diagram of some non-limiting embodiments or aspects of a method for authorizing and provisioning a token to an appliance to process a transaction.

Referring now to FIG. 5, shown is a flow diagram of some non-limiting embodiments or aspects of a method (5000) for authorizing an appliance to process a transaction. One or more steps of the method (5000) may be performed partially or completely by a transaction processing system, although it will be appreciated that other devices and/or systems may perform one or more steps in some non-limiting embodiments or aspects. As shown in FIG. 5, at step (502), an original account identifier is issued and registered to an appliance. As described herein, the original account identifier ($D_{PAN}$) is not associated with any user or appliance owner at the time of issuance. In step (504), a transaction request is received directly or indirectly from the appliance. The transaction request includes the $D_{Token}$ and/or $D_{PAN}$ associated with the appliance. In step (506), an authorization request, including the $D_{PAN}$, is generated. In step (508), the authorization request is communicated to an issuer system associated with the $D_{PAN}$.

Also provided herein are a system and method for authorizing an appliance to receive a payment. Such a system is shown in FIG. 1 and FIG. 3 according to some non-limiting embodiments and aspects. The system and method may utilize the same components as described above, including an appliance (102), an issuer system (114), and a transaction processing system (110). The components may communicate through network (101). An original $D_{PAN}$ (104) is registered to the appliance (102) by issuer system (114) and/or transaction processing system (110). The $D_{PAN}$ (104) is an original PAN that is not associated with a user or appliance owner at the time of issuance, such that the $D_{PAN}$ (104) is not issued to a human being, even though in some non-limiting embodiments or aspects the $D_{PAN}$ (104) may be subsequently linked to a user PAN. In some non-limiting embodiments or aspects, both the issuer system (114) and the transaction processing system (110) collaborate to issue the $D_{PAN}$ (104) to the appliance. In some non-limiting embodiments or aspects, registering the original account identifier includes associating a unique device identifier specific to the appliance with the $D_{PAN}$ (104). The unique device identifier specific to the appliance may be encoded into memory (105) of the appliance (102).

A method for authorizing a transaction is described above. The same components useful for authorizing a transaction may be useful for authorizing acceptance of a payment by the appliance (102). For example, and without limitation, a user may interact with appliance (102) through a user device (103), or through appliance (102) itself, to submit a payment for, e.g., rental/leasing of the appliance, or the like. As with traditional payment methods, this may involve the user, through user device (103) or directly through appliance (102) itself, communicating a payment request, including an account identifier associated with the user (e.g., an $U_{PAN}$ or $U_{Token}$), to appliance (102). A payment request may include $D_{PAN}$, $D_{Token}$, $U_{PAN}$, and/or $U_{Token}$. In addition, the payment request may include payment data, such as, for example and without limitation, payment amount, payment date, payment time, payment location, merchant identifier(s), identification of product(s)/service(s) being purchased, appliance information (e.g., a unique device identifier, a device profile, etc.) and/or the like.

Appliance (102) communicates the payment request to merchant system (108) and/or acquirer system (112), which may be, for example and without limitation, associated with a rental car company or other leasing or rental agency. The acquirer system (112) then communicates the payment request to the transaction processing system (110) to validate the payment request and receive authorization to process the payment. The transaction processing system (110) determines that the payment is authorized by communicating $U_{PAN}$ and/or $U_{Token}$ and, optionally in some non-limiting embodiments or aspects the payment data, to an issuer system (116) associated with the $U_{PAN}$ and/or $U_{Token}$. If issuer system (116) authorizes the payment, an authorization response is communicated to the transaction processing system (110), which then processes the payment. In some non-limiting embodiments or aspects, transaction processing system (110) communicates the authorization to appliance (102), merchant system (108), acquirer system (112), and/or user device (103). As described above, in some non-limiting embodiments or aspects, the authorization by the transaction processing system may be a two-step authorization, whereby in a first step the transaction processing system (110) may conduct a check of the $D_{Token}$ (106) and/or $D_{PAN}$ (104) in the token vault (118), and, in response to determining that the $D_{Token}$ (106) and/or $D_{PAN}$ (104) are associated with an $M_{PAN}$ (e.g., an account identifier associated with a rental car company, leasing agency, or the like) in the token vault (118), the transaction processing system (110) may determine that the payment is authorized. In a second authorizing step, the transaction processing system may communicate the $U_{PAN}$ and/or $U_{Token}$ and, optionally in some non-limiting embodiments or aspects the payment data, to an issuer system (116) associated with the $U_{PAN}$ and/or $U_{Token}$, as described above. In some non-limiting embodiments or aspects, the transaction processing system (110), issuer system (114), and/or appliance (102) itself, determine that a payment request satisfies a domain restriction associated with the appliance prior to authorization and processing of the payment by the transaction processing system (110).

In some non-limiting embodiments or aspects, when transaction processing system (110) processes a payment request received by appliance (102), the transaction processing system (110) generates an authorization request to deduct an amount corresponding to the payment value and communicates the authorization request to issuer system (114). This deducted amount is deposited with an issuer system associated with the $M_{PAN}$ stored in the token vault (118). In some non-limiting embodiments or aspects, transaction processing system (110) aggregates payment data for payments received by appliance (102) over a certain time period, and generates and communicates to issuer system (114) a single authorization request to deduct an amount corresponding to the aggregated payment amount, and to deposit the aggregated payment amount with an issuer system associated with the $M_{PAN}$ stored in the token vault (118).

Further provided herein is an appliance for conducting transactions without the need for a user-specific account. With reference back to FIG. 1, the appliance (102) includes memory (105) internal to the appliance (102) storing a $D_{PAN}$ (104) not associated with any user and/or a $D_{Token}$ (106) uniquely associated with the device account identifier, a communication device, and a processor in communication with the memory and the communication device, the processor being programmed or configured to generate a transaction request including at least one of the $D_{PAN}$ (104) and $D_{Token}$ (106). In some non-limiting embodiments or aspects, the appliance processor is programmed or configured to communicate a transaction request to a transaction processing system, receive a rejection of the transaction request, and in response, generate a new transaction request including at least one of the $D_{PAN}$ (104) and $D_{Token}$ (106), and at least one other $D_{PAN}$ or $D_{Token}$ associated with at least one other appliance, and communicate the new transaction request to the transaction processing system.

EXAMPLES

Example 1—Smart Home

In a smart home implementation incorporating non-limiting embodiments or aspects of the disclosure described herein, one or more appliances, such as a washing machine, refrigerator, television, and/or the like, conduct transactions with providers of goods and/or services, utility companies, and/or device manufacturers, for example, and without limitation, to order supplies that are or are believed to be depleted, to schedule maintenance or repairs, to purchase media content or software, to purchase access to a service, and/or the like. The transaction is requested using one or more $D_{Tokens}$ and/or $D_{PANs}$ associated with the respective appliances. As described above, the $D_{PAN}$ provisioned on each device may have associated domain restrictions, such as, for example and without limitation, a permitted list of products, brands, and merchants along with credit/debit limit values and/or transaction limit values. The appliances may also be preconfigured with an initial credit limit/debit fund value (e.g., $20, $50, etc. depending on device model and/or manufacturer), which may be incorporated into the sales/rental/lease price of the appliance with or without a discount.

In addition to driving promotional recommendations and offers as described above, device profiles can also be used for relative profile ranking. Relative ranking of device profiles can be developed in a manner analogous to that for customer profiles with credit card issuers. The higher a device profile is ranked, the better the offers that can be availed using the $D_{PAN}$ issued to the device. Consequently, a better profile adds value to a device, which adds a premium to the resale value of the device. For example, and without limitation, a washing machine, which purchases primarily detergent and detergent-like products, can be limited to a specific merchant domain, may receive targeted promotions or offers, and may rapidly accumulate loyalty or reward points associated with the merchant. This accumulated value adds to resale value, as the accumulated loyalty or reward points can contribute to lower cost of operation in the future, which can be advertised by the appliance owner when attempting to sell the appliance. Identical appliances (in terms of manufacturer/model), but with different device profiles, could have different resale values owing to the difference in goods/services offer benefits available to the new owners.

An additional feature of a smart home solution includes splitting payments across a plurality of appliances with overlapping domain restrictions. For example, and without limitation, a refrigerator in which the $D_{PAN}$ is limited to a specific monthly, quarterly, or yearly credit/debit limit value may, when submitting a transaction request, combine its remaining credit/debit limit value with that of a microwave provisioned with a $D_{PAN}$ that maintains a sufficient amount of credit/debit limit value based on the microwave's device profile. Moreover, appliances in a common household may seek permission to use offers (e.g., discounts) available on other devices with overlapping domain restrictions.

Example 2—Smart Cars

In a rental car implementation incorporating non-limiting embodiments or aspects of the disclosure described herein, one or more vehicles may conduct transactions with other appliances (e.g., toll booths, gas stations, other automobiles, or other like systems or service providers) and/or conduct transactions with individuals who rent/lease the vehicles.

In such an example, each car in a fleet of rental vehicles may have a financial account issued to it ($D_{PAN}$), with a corresponding token ($D_{Token}$), with a mapping to the fleet owner PAN ($M_{PAN}$) in a token vault. Each vehicle could accept direct payments from renters, and based on the mapping in the token vault, rather than authorization to deduct funds from the $M_{PAN}$ as described above, funds would be received by the appliance, through $D_{PAN}$, from a user/renter account (based on a $U_{PAN}$ or $U_{Token}$), and would be deposited to an account associated with the $M_{PAN}$. In addition, similar to the process described above, a vehicle provisioned with a $D_{Token}$ could make payments for its requirements such as fuel, tolls, maintenance, insurance, and the like. Domain restrictions could be applied at a car payment module to make purchases at specific merchants and/or for specific merchant categories. The vehicles in the rental car fleet may be further connected to each other to allow borrowing/aggregating credit/debit limit values, as described above, if required.

Such a system could also benefit a renter as certain loyalty or reward points, such as fuel reward points, associated with the $D_{PAN}$, as described above, could result in better offers for fuel. Further, in an international location for a renter, the vehicle may pay in local currency, and the renter may therefore avoid multiple foreign currency transactions (including possible currency conversion surcharges) on a single user account identifier.

As explained above, as with all appliances, a vehicle may have a credit/debit limit value assigned based on the vehicle type, manufacturer, transaction history, rental location, and/or the associated credit score of the entity/institution that owns/operates the fleet. The initial credit/debit limit may be defined by the relationship between the automobile manufacturer and a bank/payment network. For example, and without limitation, Car Company A may link with Bank A and Transaction Service Provider A to provision credit/debit cards having $D_{PANs}$ with a limit of $1000 USD for all SUVs manufactured by Car Company A.

Although the disclosure has been described in detail for the purpose of illustration based on what is currently considered to be the most practical and preferred embodiments, it is to be understood that such detail is solely for that purpose and that the disclosure is not limited to the disclosed embodiments, but on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for authorizing and provisioning a token to an appliance, comprising:
   registering, with at least one processor, an original account identifier to at least one appliance, wherein the original account identifier is a payment account number not associated with any user;
   generating, with the at least one processor, a device token based at least on the original account identifier, wherein the device token is stored by the at least one appliance;
   after generating the device token, associating, with the at least one processor, a user account identifier for a user to at least one of the device token and the original account identifier registered to the at least one appliance, wherein the user account identifier is a payment account identifier;

generating, with the at least one processor, a device profile for the at least one appliance based at least partially on at least one of the following appliance parameters: model, manufacturer, transaction history, age, service history, or any combination thereof;

receiving, from the at least one appliance, a transaction request for a transaction, the transaction request comprising the device token;

identifying, with the at least one processor, the user account identifier based on the device token;

determining, with the at least one processor, that the transaction is authorized based at least partially on the user account identifier and the original account identifier registered to the at least one appliance; and in response to determining that the transaction is authorized, processing the transaction.

2. The computer-implemented method of claim 1, wherein determining that the transaction is authorized comprises:

communicating a first authorization request to an issuer system associated with the original account identifier registered to the at least one appliance;

communicating a second authorization request to an issuer system associated with the user account identifier; and receiving at least one authorization response message from at least one of the issuer system associated with the user account identifier and the issuer system associated with the original account identifier registered to the at least one appliance.

3. The computer-implemented method of claim 1, wherein registering the original account identifier to the at least one appliance comprises associating at least one device identifier unique to the at least one appliance with the original account identifier.

4. The computer-implemented method of claim 1, further comprising:

aggregating, with the at least one processor, transaction values from the transaction and at least one other transaction initiated by the at least one appliance within a time period to calculate an aggregated transaction value; and generating, with the at least one processor, an authorization request to deduct the aggregated transaction value from a user account corresponding to the user account identifier.

5. The computer-implemented method of claim 1, further comprising generating a credit limit value for the at least one appliance based at least partially on the device profile.

6. The computer-implemented method of claim 5, wherein processing the transaction comprises:

determining, with the at least one processor, that a transaction value associated with the transaction satisfies the credit limit value;

in response to determining that the transaction value does not satisfy the credit limit value, communicating, with the at least one processor, a rejection of the transaction to the at least one appliance or to an acquirer system;

receiving, from the at least one appliance and/or at least one other appliance, a new transaction request for the transaction, the new transaction request comprising the device token and at least one other device token associated with the at least one other appliance; and in response to determining that the new transaction request is authorized, processing, with the at least one processor, the new transaction request by charging a first portion of the transaction value to an account corresponding to the device token and a second portion of the transaction value to an account corresponding to the at least one other device token.

7. The computer-implemented method of claim 5, further comprising altering, with the at least one processor and based at least partially on the device profile, the credit limit value.

8. The computer-implemented method of claim 1, further comprising associating, with the at least one processor, a merchant domain restriction with the device token based at least partially on the device profile.

9. The computer-implemented method of claim 8, wherein processing the transaction comprises:

determining, based on the device token and the merchant domain restriction, that a transaction is authorized; and in response to determining that the transaction is authorized, processing, with the at least one processor, the transaction.

10. A system for authorizing and provisioning a token to an appliance, comprising at least one processor programmed to:

register an original account identifier to at least one appliance, wherein the original account identifier is a payment account number not associated with any user;

generate a device token based at least on the original account identifier, wherein the device token is stored by the at least one appliance;

after generating the device token, associate a user account identifier for a user to at least one of the device token and the original account identifier registered to the at least one appliance, wherein the user account identifier is a payment account identifier;

generate a device profile for the at least one appliance based at least partially on at least one of the following appliance parameters: model, manufacturer, transaction history, age, service history, or any combination thereof;

receive, from the at least one appliance, a transaction request for a transaction, the transaction request comprising the device token;

identify the user account identifier based on the device token;

determine that the transaction is authorized based at least partially on the user account identifier and the original account identifier registered to the at least one appliance; and in response to determining that the transaction is authorized, process the transaction.

11. The system of claim 10, wherein the at least one processor is programmed to determine that the transaction is authorized by:

communicating a first authorization request to an issuer system associated with the original account identifier registered to the at least one appliance;

communicating a second authorization request to an issuer system associated with the user account identifier; and receiving at least one authorization response message from at least one of the issuer system associated with the user account identifier and the issuer system associated with the original account identifier registered to the at least one appliance.

12. The system of claim 10, wherein the at least one processor is programmed to register the original account identifier to the at least one appliance by associating at least one device identifier unique to the at least one appliance with the original account identifier.

13. The system of claim 10, wherein the at least one processor is further programmed to:
   aggregate transaction values from the transaction and at least one other transaction initiated by the at least one appliance within a time period to calculate an aggregated transaction value; and
   generate an authorization request to deduct the aggregated transaction value from a user account corresponding to the user account identifier.

14. The system of claim 10, wherein the at least one processor is further programmed to generate a credit limit value for the at least one appliance based at least partially on the device profile.

15. The system of claim 14, wherein the at least one processor is programmed to process the transaction by:
   determining that a transaction value associated with the transaction satisfies the credit limit value;
   in response to determining that the transaction value does not satisfy the credit limit value, communicating a rejection of the transaction to the at least one appliance;
   receiving, from the at least one appliance and/or at least one other appliance, a new transaction request for the transaction, the new transaction request comprising the device token and at least one other device token associated with the at least one other appliance; and
   in response to determining that the new transaction request is authorized, processing the new transaction request by charging a first portion of the transaction value to an account corresponding to the device token and a second portion of the transaction value to an account corresponding to the at least one other device token.

16. The system of claim 15, wherein the at least one processor is further programmed to alter, based at least partially on the device profile, the credit limit value.

17. The system of claim 16, wherein the at least one processor is programmed to alter the credit limit value when the user account identifier is associated to the device token or the original account identifier is registered to the at least one appliance.

18. The system of claim 10, wherein the at least one processor is programmed to associate a merchant domain restriction with the device token based at least partially on the device profile.

19. The system of claim 18, wherein the at least one processor is programmed to process the transaction by:
   determining, based on the device token and the associated merchant domain restriction, whether a transaction is authorized; and
   in response to determining that the transaction is not authorized, communicating a rejection of the transaction to the at least one appliance; or
   in response to determining that the transaction is authorized, processing the transaction.

20. A computer-implemented method for authorizing an appliance to process a transaction, comprising:
   registering, with at least one processor, an original account identifier to at least one appliance, wherein the original account identifier is a payment account number not associated with any user;
   generating, with the at least one processor, a device token based at least on the original account identifier, wherein the device token is stored by the at least one appliance, and wherein the at least one of the original account identifier and the device token is associated with a payment account identifier;
   generating, with the at least one processor, a device profile for the at least one appliance based at least partially on at least one of the following appliance parameters: model, manufacturer, transaction history, age, service history, or any combination thereof;
   receiving, from the at least one appliance, a transaction request comprising at least one of the original account identifier and the device token;
   generating, with the at least one processor, an authorization request comprising the original account identifier; and
   communicating the authorization request to an issuer system associated with the original account identifier.

* * * * *